United States Patent Office 3,471,564
Patented Oct. 7, 1969

3,471,564
HYDROXY- AND AMINOALKYL AMINO-
THIOALKYL ETHERS
Richard A. Hickner, Midland, Mich., assignor to The
Dow Chemical Company, Midland, Mich., a corporation of Delaware
No Drawing. Filed Oct. 5, 1967, Ser. No. 673,024
Int. Cl. C07c 149/24; A61k 27/00; A01m 9/12
U.S. Cl. 260—584                                7 Claims

ABSTRACT OF THE DISCLOSURE

Compounds of the structure $RSR_1NHR_2$ where R is an alkyl group of 9–14 C atoms, $R_1$ is an alkylene group of 2–3 C atoms and $R_2$ is an aminoalkyl or a hydroxyl alkyl group having 2–3 C atoms are prepared by reacting an N - (2 - amino) - or N(2-hydroxyethyl(aziridine with a mercaptan. The new compounds are fungicides and bactericides.

---

This invention relates to novel hydroxy- and aminoalkylaminothioalkyl ethers and to methods for their preparation and more particularly pertains to compounds of the structure $RSR_1NHR_2$ wherein R is an alkyl group of 9 to 14 C atoms, $R_1$ is an alkylene group of 2–3 C atoms, and $R_2$ is a hydroxy- or aminoalkyl group of from 2–3 C atoms, and to methods of preparing the compounds by reacting a $C_9$–$C_{14}$ alkyl mercaptan with a 2–3 C atom hydroxyalkyl or aminoalkyl N substituted aziridine in accordance with the following formula

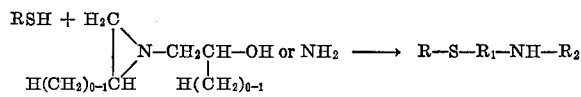

The new compounds of this invention are fungicides and bactericides. They can also be oxidized with peroxides or peracids to form sulfoxides which have good surface active properties, as described in copending patent application S.N. 627,967 filed Oct. 5, 1967; in the names of R. A. Hickner and W. O. Siegl.

An object of this invention is the provision of new compounds having good bactericidal and fungicidal properties.

Another object is the provision of new compounds which control or kill bacteria and fungi at low concentration in water solutions.

Another object is a method for preparing the novel compounds by reacting a mercaptan with an N-(hydroxyalkyl) or N-(aminoalkyl) substituted aziridine.

The mercaptans which can be used for synthesizing the new compounds of this invention are alkyl mercaptans of the formula RSH where R is an alkyl group of from 9 to 14 C atoms. The alkyl group can be normal or branched chain.

Representative mercaptans are $C_9H_{19}SH$, $C_{10}H_{21}SH$, $C_{11}H_{23}SH$, $C_{12}H_{25}SH$, $C_{13}H_{27}SH$, and $C_{14}H_{29}SH$. The alkyl group in each instance can be normal or any branched chain alkyl group of $C_9$–$C_{14}$ carbon atoms. The SH group can be on a terminal or non-terminal carbon atom.

The aziridines which are reacted with the mercaptan have the generic formula

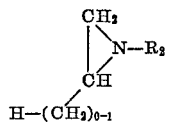

where $R_2$ is a —$CH_2CH_2OH$, —$CH_2CHOHCH_3$, —$CH_2CH_2CH_2OH$, —$CH_2CH_2NH_2$, —$CH_2CHNH_2CH_3$, or a —$CH_2CH_2CH_2NH_2$ group.

The reaction is carried out by commingling the mercaptan with the N-hydroxyalkyl or N-aminoalkyl aziridine. The order of addition of ingredients is not absolutely critical, but, because of the reactivity of the N-substituted aziridine, it is preferable to add the latter to the stirred mercaptan.

If desired, the reaction can be run continuously by feeding each ingredient through separate lines into a reaction zone, and continuously removing the reacted mixture from such zone.

The molar ratio of reactants is preferably about 1 to 1, but some deviation of from about 0.5 to about 2 moles of mercaptan per mole of the aziridine compound can be used.

The reaction temperature can range from about 25 to about 150° C. The preferred range is 40 to 80° C.

Although the reaction can be carried out in the absence of diluents, it is preferred to run it in liquid inert materials, because heat control and stirring are facilitated thereby. The diluent should not react with the mercaptan or the N-substituted aziridine. Representative useful diluents are liquid lower alkanols, usually those containing from 1 to about 4 C atoms, liquid saturated aromatic hydrocarbons such as benzene, toluene, xylenes, trimethyl benzenes, liquid alkyl ethers of from 4 to about 10 C atoms, and mono or polyhydric alkanols, liquid alkyl nitriles and N,N-disubstituted amides and mixtures of any of the above diluents.

Pressure has no effect on the reaction, so that it can be run under vacuum, at atmospheric or superimposed pressure. Preferably, the reaction is run at autogenous pressure. If the mercaptan or diluent boils at the temperature employed, it is preferred to run at superimposed pressure.

The examples which follow are intended to illustrate the invention but not to limit it. All parts and percentages are by weight unless specifically indicated otherwise.

Example 1

To a solution of 0.5 mole of 1-dodecanethiol in 200 ml. of methanol, which was preheated to 50° C., was slowly added 0.5 mole of N(2-hydroxyethyl)aziridine over a two hour period. The mixture was heated at 60° C. for an additional 9 hours. The reaction mixture was stirred during the entire period. The solvent was removed at reduced pressure. The residue was charged to a flash still and distilled until a pot temperature of 139° at 0.1 mm. was reached. The white waxy solid, having a melting point of 49–54° C., weighed 134 g. It had 66.2% carbon and 12.2% hydrogen, compared to a theoretical value of 66.2% C. and 12.1% H.

This compound has the formula

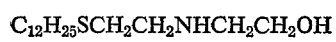

$C_{12}H_{25}SCH_2CH_2NHCH_2CH_2OH$

When tested at 400 p.p.m. in water it showed 97% kill of apple scab on foliage and 50% kill of downy mildew.

At 10 p.p.m. it killed the organism causing athletes foot, and Can. pelliculosa and P. pullorum.

At 100 p.p.m. it killed S. aureus, C. albicans, B. subtilis and A. terreus.

Examples 2–4

Additional novel compounds made by following the general procedure described in Example 1 were made from the reactants tabulated below.

| Mercaptan | Aziridine | New Compound |
|---|---|---|
| 2. nC₁₀H₂₁SH | CH₂—CH₂ (ring) N-CH₂CH₂OH | C₁₀H₂₁S—(CH₂)₂NH(CH₂)₂OH |
| 3. nC₁₀H₂₁SH | CH₂—CH₂ (ring) N—CH₂CH₂NH₂ | C₁₀H₂₁S(CH₂)₂NH(CH₂)₂NH₂ |
| 4. C₁₂H₂₅SH | CH₂—CH₂ (ring) N—CH₂CH₂NH₂ | C₁₂H₂₅S(CH₂)₂NH(CH₂)₂NH₂ |

Compound 2 was a waxy solid with a melting point of 45–48° and a boiling point at .03 mm. pressure of about 154° C.

Compound 3 had a boiling point of about 140° C. at .03 mm. and Compound 4 boiled at about 176° C. at .22 mm. pressure.

The microcidal properties showing p.p.m. in water of each new compound required for a complete kill of several species of bacteria and fungi are listed below.

ORGANISM TESTED

| Comp. No. | S. aureus | Can. albicans | E. coli | S. typhosa | Myco Phlei | Athletes foot | B. subtilis | C. pelliculosa | Aerobacter | P. pullans | A. terreus | R nigricans |
|---|---|---|---|---|---|---|---|---|---|---|---|---|
| 2 | 100 | 10 | 500 | 500 | <500 | 100 | 100 | 10 | 500 | 10 | 10 | 10 |
| 3 | 100 | 100 | 100 | 100 | <500 | 10 | 100 | 100 | 100 | 10 | 100 | 10 |
| 4 | 100 | 100 | | | <500 | 100 | 100 | 100 | 100 | 10 | 100 | 50 |

Compound 2 gave 75% protection from infection of apple scab; Compound 3 gave 97% protection for the same infection and 75% protection from late blight; Compound 4 gave 97% protection from apple scab, 75% from late blight and 100% from downy mildew.

The compounds are also good surface active agents, particularly at low pH. These properties are tabulated below for a 0.1 weight percent solution at 25° C., in water acidified to pH 1 with HCl.

| | Compound No. | | | |
|---|---|---|---|---|
| | 1 | 2 | 3 | 4 |
| Surface tension (dynes/cm.) | 43.4 | 43.5 | 28.2 | 32.2 |
| Interfacial tension | 17.2 | 16.1 | 3.0 | 6.5 |
| Foam height initial (mm.) | 174 | 165 | 203 | 207 |
| Foam height after 5 min. (mm.) | 127 | 145 | 200 | 202 |
| Percent foam stability | 73 | 88 | 98 | 97 |
| Wetting time/minutes | 1.8 | 0.8 | 0.5 | 0.5 |

The remaining compounds of this invention conforming to the generic formula described above can be made by the same general procedures as those specifically shown. They are all biocidally active against one or all of the organisms mentioned above and all are surface active at pH 1 in aqueous solution.

I claim:
1. Compounds of the structure RS—R₁NHR₂ wherein R is an alkyl group of from 9 to 14 C atoms, inclusive, R₁ is an alkylene group of from 2 to 3 C atoms, inclusive, and R₂ is a hydroxyalkyl or aminoalkyl group of from 2 to 3 C atoms.
2. Compounds of claim 1 in which R₁ is —CH₂CH₂—.
3. Compounds of claim 1 in which R₂ is —CH₂CH₂OH.
4. Compounds of claim 1 in which R₂ is

—CH₂CH₂NH₂

5. Compounds of claim 1 in which R₁ is $$-CH_2\overset{|}{\underset{}{CH}}-\ \ \ \text{with}\ \ CH_3$$

—CH₂CH—
  |
  CH₃

6. Compounds of claim 1 in which R₂ is

—CH₂—CHOH
      |
      CH₃

7. Compounds of claim 1 in which R₂ is

—CH₂CH—NH₂
    |
    CH₃

References Cited

UNITED STATES PATENTS 2,304,623  12/1942  Berchet.
3,312,732  4/1967  Gollis et al.

CHARLES B. PARKER, Primary Examiner
R. L. RAYMOND, Assistant Examiner

U.S. Cl. X.R.

252—152; 260—583; 424—325